(12) United States Patent
Okada et al.

(10) Patent No.: US 7,181,074 B2
(45) Date of Patent: Feb. 20, 2007

(54) IMAGE CODING APPARATUS AND METHOD

(75) Inventors: Shigeyuki Okada, Oogaki (JP); Hideki Yamauchi, Oogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 709 days.

(21) Appl. No.: 10/386,700

(22) Filed: Mar. 13, 2003

(65) Prior Publication Data
US 2003/0179942 A1    Sep. 25, 2003

(30) Foreign Application Priority Data
Mar. 19, 2002  (JP) .............................. 2002-077356

(51) Int. Cl.
*G06K 9/46* (2006.01)
(52) U.S. Cl. .................... 382/240; 382/232; 382/260
(58) Field of Classification Search ................ 382/100, 382/232, 240, 250, 248, 112, 254, 270, 271, 382/272, 260; 348/208.5, 208.2, 208.8; 358/465
See application file for complete search history.

(56) References Cited

U.S. PATENT DOCUMENTS

| | | | | |
|---|---|---|---|---|
| 5,867,213 | A * | 2/1999 | Ouchi ...................... | 348/208.5 |
| 6,690,732 | B2 * | 2/2004 | Naito et al. ............ | 375/240.24 |
| 6,904,096 | B2 * | 6/2005 | Kobayashi et al. .... | 375/240.26 |
| 7,039,250 | B2 * | 5/2006 | Kuroiwa ..................... | 382/248 |

FOREIGN PATENT DOCUMENTS

| | | | |
|---|---|---|---|
| JP | 4-349789 | A | 12/1992 |
| JP | 11-27574 | A | 1/1999 |
| JP | 2001-183575 | A | 7/2001 |
| JP | 2002-64823 | A | 2/2002 |

OTHER PUBLICATIONS

English translation of a Chinese Office Action for the corresponding Chinese Patent Application # 03107669.6 dated Jun. 4, 2004.
Office Action issued in corresponding Japanese Patent Application No. 2002-077356.

* cited by examiner

*Primary Examiner*—Anh Hong Do
(74) *Attorney, Agent, or Firm*—McDermott Will & Emery LLP (57) ABSTRACT

An original image shot by a shooting unit is read in a frame buffer and transformed by a wavelet transformer. An evaluating unit monitors the coefficients of the HL, LH, HH sub-bands generated by the wavelet transformer and checks the number of the high frequency components in the original image. If there are sufficient high frequency components, the quality of the original image is judged to be good, and if not, the image quality is judged not to be good because of camera shake or the like. The evaluating unit sends a coding indication signal to a quantizer if the image quality is good. Thereby the wavelet transformed image is coded. If the image quality is not good, the evaluating unit sends a re-shooting indication signal to the shooting unit.

9 Claims, 7 Drawing Sheets

IMAGE CODING APPARATUS AND METHOD

BACKGROUND OF THE INVENTION

1. Field of the Invention

This invention relates to an image coding technology, and it particularly relates to method and apparatus for evaluating the quality of an image during the coding process.

2. Description of the Related Art

During the 1990's in particular, the widespread use of PCs (personal computers) and other information equipment, the popularization of digital cameras, color printers and so forth and the explosive increase in the use of the Internet accounted for a deep infiltration of the culture of digital images into the everyday life of ordinary people. Under these circumstances, coding and compression technologies such as JPEG (Joint Photographic Experts Group) for static images and MPEG (Moving Picture Experts Group) for moving images, have been standardized so as to improve the facility of distribution and reproduction of images through recording media such as CD-ROMs, and transmission media such as networks and broadcasting waves.

In the JPEG series, JPEG 2000 using discrete wavelet transform (DWT) has been standardized in order to achieve further improvement of compression efficiency as well as to attain high image quality. DWT replaces discrete cosine transform (DCT) which conducts a filtering on the image on a block basis and plays an important role in the performance of compressing the image in JPEG 2000. In addition, in MPEG, the same wavelet transform is employed in texture compression.

The digital camera and camcorder have been miniaturized and rendered multifunctional and the convenience of their use has been greatly improved. On the other hand, because of the light weight of the camera body and the high magnification of the optical zoom, it is very difficult for novice users to avoid the bad effects of camera shake during shooting. In addition, although the resolution of the image is increased very rapidly because of the high density of CCD, such high resolution is not much use when the bad effects caused by camera shake prevail. It therefore becomes meaningless to pursue the enhancement of the performance of the products.

Moreover, when motion pictures are shot for long periods by a security camera or the like, the image data are stored in a large storage device, and motion frames with bad image quality such as poor focus can waste this storage space.

SUMMARY OF THE INVENTION

The present invention has been made with a view to the above-mentioned problems, and an object thereof is to provide an image coding technology which can evaluate the quality of an image which may be affected by shooting conditions or problems such as camera shake or poor focus caused by user error, or the like. Another object is to provide an image coding technology which can evaluate the image quality in order to minimize additional computing costs.

According to one aspect of the present invention, an image coding apparatus is provided. The apparatus comprises a spatial filter which conducts a filtering process on an image in such a manner that the whole shot image is handled as a single item, a coding unit which codes the image on the basis of a processing result produced by the spatial filter, and an evaluating unit which evaluates the quality of the image according to the amount of high frequency component in the image which is extracted during the filtering process by the spatial filter. During the filtering process for coding the image, the high frequency components of the image are extracted and image quality brought about by the shooting conditions such as camera shake and poor focus are evaluated. This filtering process handles and processes the whole image as a single item and transforms the whole image into spatial frequency components like a discrete wavelet transform, for instance. Since no block noise arises in the discrete wavelet transform that filters the whole image, unlike the case in which a discrete cosine transform is performed block by block, the characteristics of the image in the spatial frequency region can be evaluated precisely and the edge of the image can be extracted with high accuracy.

A plurality of images continuously shot for a relatively short period may be input, and the evaluating unit may decide that one image which has the largest amount of high frequency component is a desirable image shot under good shooting conditions. The apparatus may further comprise a storage control unit which selectively stores into a memory the desirable image. Such continuous shooting and the selection of desirable images may be performed automatically, or a mode for selecting the desirable image may be explicitly provided and the continuous shooting and the image selection may be performed when a user selects that mode.

The coding process performed by the coding unit may be omitted for those images which are evaluated by the evaluating unit as having a smaller amount of high frequency component than the amount predefined. For this purpose, the evaluating unit may provide a coding indication signal to the coding unit to perform the coding process. The predefined amount is the amount of high frequency component that is normally included in an image without camera shake and poor focus, and may be determined relatively to the image to be shot or may be adaptively changed according to the type of image to be shot or the shooting conditions. In the case of images shot continuously, the coding process may be omitted for at least one image which is evaluated as having a smaller amount of high frequency component than the other images.

A plurality of images continuously shot may be input, and the evaluating unit may decide that there has been a scene change when it detects a greater amount of change than the predefined amount in the distribution of high frequency component in the images. In the case in which one image that has the largest amount of high frequency component is evaluated as being the best image, further such evaluation may be cancelled across the scene change when a scene change is detected. The apparatus may comprise a storage control unit that selectively stores into a memory the image involved in the scene change.

The evaluating unit may judge the quality of the image according to the high frequency component of an important region of the image. The important region of the image may be, for instance, the central area of the image, or the area where a figure is shot, which may be different depending on the purpose of the image.

The spatial filter may conduct a two-dimensional wavelet transform on the image and the evaluating unit may evaluate the image quality according to the wavelet transform coefficients of at least one of the HL, LH, and HH sub-bands generated from the image by the spatial filter. The evaluating unit may detect a maximum of absolute values of the wavelet transform coefficients and decide that the quality of the image is good and without camera shake and poor focus when the maximum exceeds a predefined value. The evaluating unit may count the wavelet transform coefficients within the sub-band, an absolute value of each of which exceeds a predefined value, and may evaluate the image quality depending on the count.

According to another aspect of the present invention, an image coding method is provided. The method comprises conducting a two-dimensional wavelet transform on the whole shot image, coding the image on the basis of a result of the two-dimensional wavelet transform, and determining the quality of the image according to the amount of a high frequency component in the image which is extracted in the two-dimensional wavelet transform.

Moreover, any arbitrary replacement or substitution of the above-described structural components and the steps, expressions replaced or substituted in part or whole between a method and an apparatus as well as addition thereof, and expressions changed to a system, a computer program, recording medium or the like are all effective as and are encompassed by the present invention.

This summary of the invention does not necessarily describe all necessary features, so that the invention may also be a sub-combination of these described features.

DETAILED DESCRIPTION OF THE INVENTION

The invention will now be described by reference to the preferred embodiments. This does not intend to limit the scope of the present invention, but exemplify the invention.

EMBODIMENT 1

Figure 1:
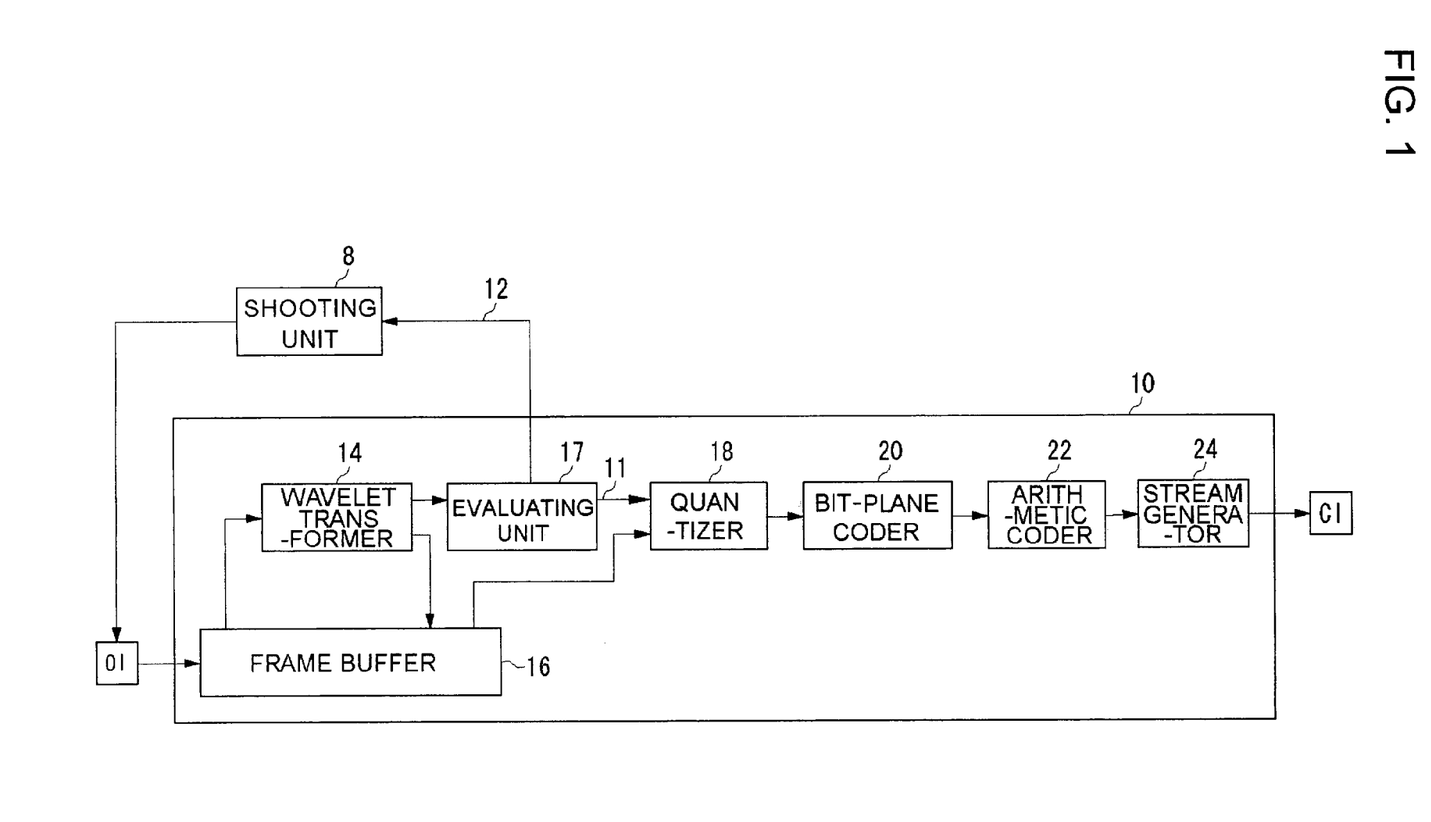
FIG. 1 is a block diagram showing a structure of an image coding apparatus according to Embodiment 1.

FIG. 1 shows the configuration of an image coding apparatus 10 according to Embodiment 1. The image coding apparatus 10 codes image data according to JPEG 2000. The specifications of JPEG 2000 are described in the standards document, ISO/IEC 15444-1: JPEG 2000 image coding system, JPEG 2000 Final Committee Draft, Aug. 18, 2000. The image coding apparatus 10 may be a normal computer and comprises a CPU, memory and program modules to code images loaded in the memory. The blocks in FIG. 1 depict functions characteristic of the present embodiment and those skilled in the art understand that the functional blocks can be embodied as hardware only, software only or as a combination of the two.

The image coding apparatus 10 comprises a wavelet transformer 14, a frame buffer 16, a quantizer 18, a bit-plane coder 20, an arithmetic coder 22 and a stream generator 24.

An original image OI is read in the frame buffer 16 when the coding process starts. The image is input directly into the frame buffer 16 from a shooting unit 8 or input via a memory.

Figure 2:
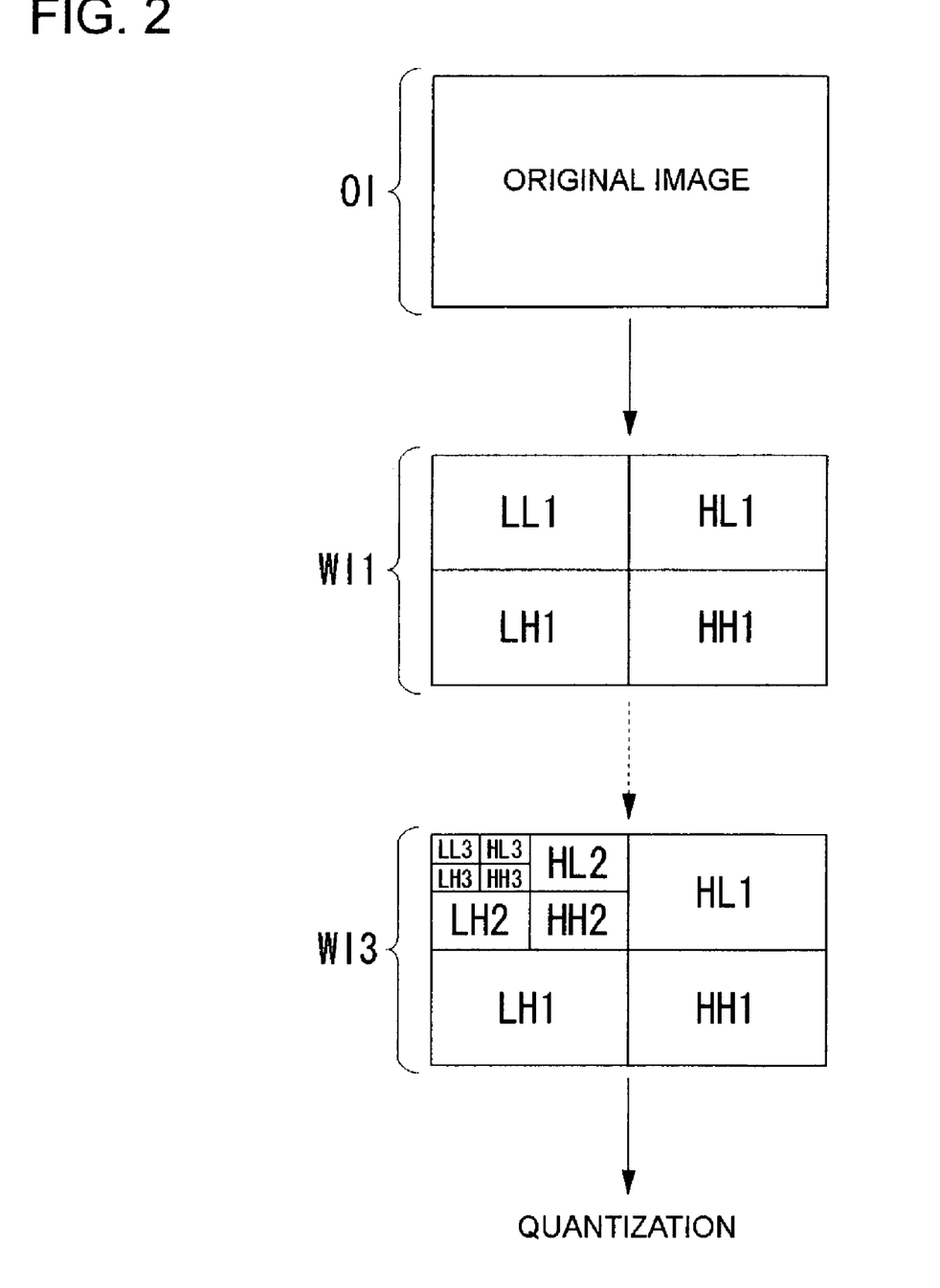
FIG. 2 illustrates the transformation process of an original image by the wavelet transformer of FIG. 1

The original image OI in the frame buffer 16 is hierarchized by the wavelet transformer 14. The wavelet transformer 14 in JPEG 2000 employs a Daubechies filter. As shown in FIG. 2, the filter simultaneously works as a low-pass filter and a high-pass filter in x, y directions and divides the original image into four frequency sub-bands. The four sub-bands are: the LL sub-band which is composed of low frequency components in x and y directions, the HL and LH sub-bands which are composed of low frequency components in one of the x and y directions and high frequency components in the other direction, and the HH sub-band which is composed of high frequency components in x and y directions. The number of pixels in each sub-band image is half of those of the original image, respectively. The filtering process therefore renders four sub-band images, the sizes of which are one-fourth the size of the input image.

The wavelet transformer 14 conducts a filtering process on the rendered LL sub-band, which is divided into LL, HL, LH and HH sub-bands. By repeating the filtering process, the LL sub-band rendered in the final filtering is obtained as an image which is closest to the DC component of the original image OI. In the same layer, the LL sub-band contains low frequency components, and the HL, LH and HH sub-bands contain high frequency components. The previous layer rendered in the previous filtering process comprises four sub-bands in which high frequency components are more dominant than those rendered in the present filtering process.

An evaluating unit 17 monitors the HL, LH and HH sub-bands generated by the wavelet transformer 14 and evaluates the number of high frequency components in the original image OI, and thereby determines the quality of the original image OI. If there is a sufficiently high number of frequency components, the quality of the original image OI is judged to be good, and if not, the image quality is judged not to be good because of camera shake, poor focus, or the like. If the image quality is good, the evaluating unit 17 sends a coding indication signal 11 to the quantizer 18. If the quality of the image is evaluated as not good, the evaluating unit 17 sends a re-shooting indication signal 12 to the shooting unit 8.

The quantizer 18 reads the image transformed by the wavelet transformer 14 from the frame buffer 16 and starts the process, if and only if the coding indication signal 11 is provided by the evaluating unit 17. Thereafter, although the detail is not described here, if the coding indication signal 11 is given, the hierarchized image is input into the quantizer 18, the bit-plane coder 20, the arithmetic coder 22 and the stream generator 24 starting with the lowest frequency component, and the final coded image data CI are generated and output from the stream generator 24.

FIG. 2 illustrates the transformation process of the original image OI by the wavelet transformer 14. The original image 01 is transformed into the first layer image WI1 that contains four sub-bands LL1, HL1, LH1, and HH1 during the first filtering by the wavelet transformer 14. The upper left sub-band LL1 of this image WI1 is further filtered and four sub-bands are generated and thus the third layer image WI3 is finally generated in the case of FIG. 2. If the evaluating unit 17 decides that the quality of the image is good, this image WI3 in the third layer is thereafter processed by the quantizer 18 and the succeeding components.

The evaluating unit 17 monitors the coefficients of the three sub-bands HL1, LH1 and HH1 of the image WI1 in the first layer of FIG. 2 and evaluates the quality of the original image OI. Since the quality of the original image OI can be judged before the final image WI3 is generated, the wavelet transformer 14 may cancel the filtering process on the subsequent layers when the evaluating unit 17 judges the image quality to be not good according to the image WI1 in the first layer.

Figure 3:
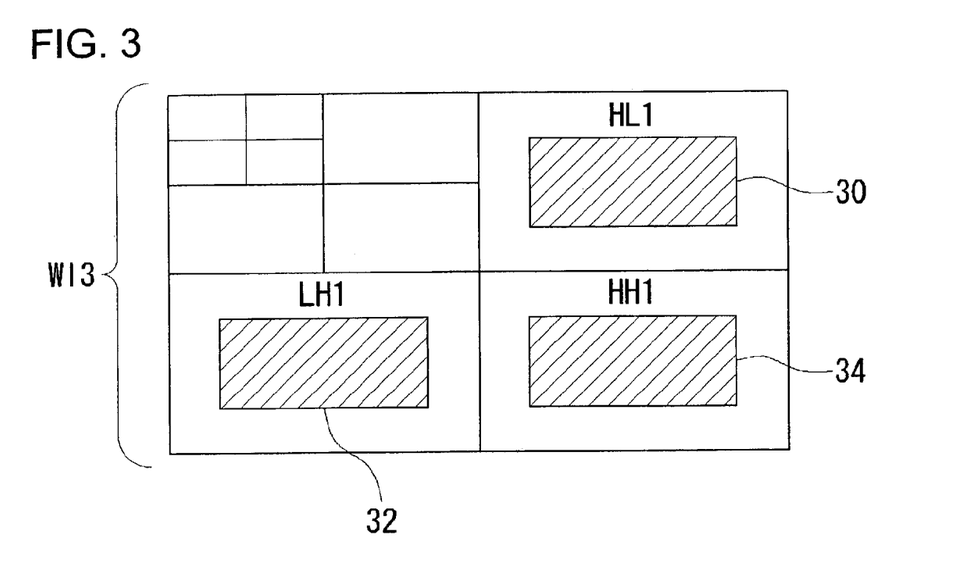
FIG. 3 illustrates how the central region of an image is extracted to evaluate the high frequency components of the image.

When the image quality is being evaluated, an important region of the image, such as the central region of the image and the region where figures are shot, may be employed. FIG. 3 depicts the case in which the high frequency components of the central region are evaluated. The central regions 30, 32 and 34 are extracted from the three sub-bands HL1, LH1 and HH1 of the image WI3 in the third layer respectively and their coefficients are evaluated. The important region of the image is not necessarily such a central region. For instance, in the case of an image shot by a security camera, the upper part, the lower part, or another specific area of the image might be an important region.

Figure 4:
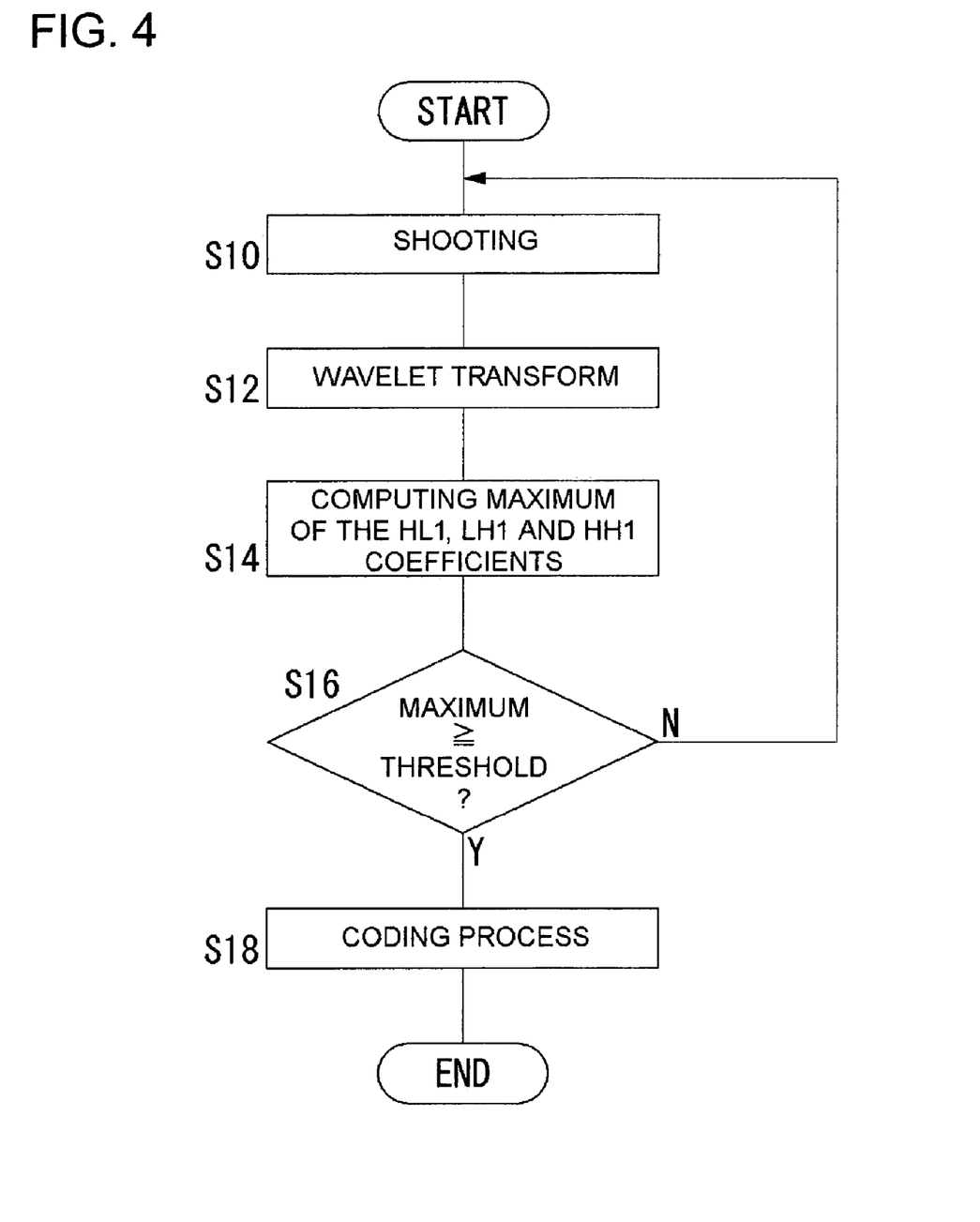
FIG. 4 is a flowchart showing an image coding procedure employed by the image coding apparatus of FIG. 1.

FIG. 4 is a flowchart showing the image coding procedure employed by the image coding apparatus 10 with the above-mentioned configuration. The original image OI is shot (S10). The original image OI is input into the frame buffer 16, and transformed by the wavelet transformer 14 (S12). The evaluating unit 17 monitors the coefficients of the three sub-bands HL1, LH1 and HH1, which contain the high frequency components, in the wavelet transformed four sub-bands in the first layer, and computes the maximum of the absolute values of the coefficients of the respective sub-band (S14).

The evaluating unit 17 compares the obtained maximum with a predefined threshold (S16), and decides that the image quality is good and then sends the coding indication signal 11 to the quantizer 18, if the maximum is greater than or equal to the threshold (Y of S16). Thereafter, the subsequent coding process is conducted on the wavelet transformed image (S18). If the maximum is less than the threshold (N of S16), the procedure goes back to step S10 and the original image OI is shot again.

The method for evaluating the high frequency components in steps S14 and S16 may possibly vary. Instead of the coefficients of all three sub-bands HL1, LH1 and HH1 being evaluated, the coefficients of at least one of the three sub-bands may be evaluated. For instance, the coefficients of only the sub-band HH1 may be evaluated or the coefficients of the two sub-bands HL1 and LH1 may be evaluated. The number of coefficient samples in the sub-bands, the absolute value of each of which exceeds a predefined value, may be counted and the image quality may be evaluated according to the number of the counted samples.

EMBODIMENT 2

Figure 5:
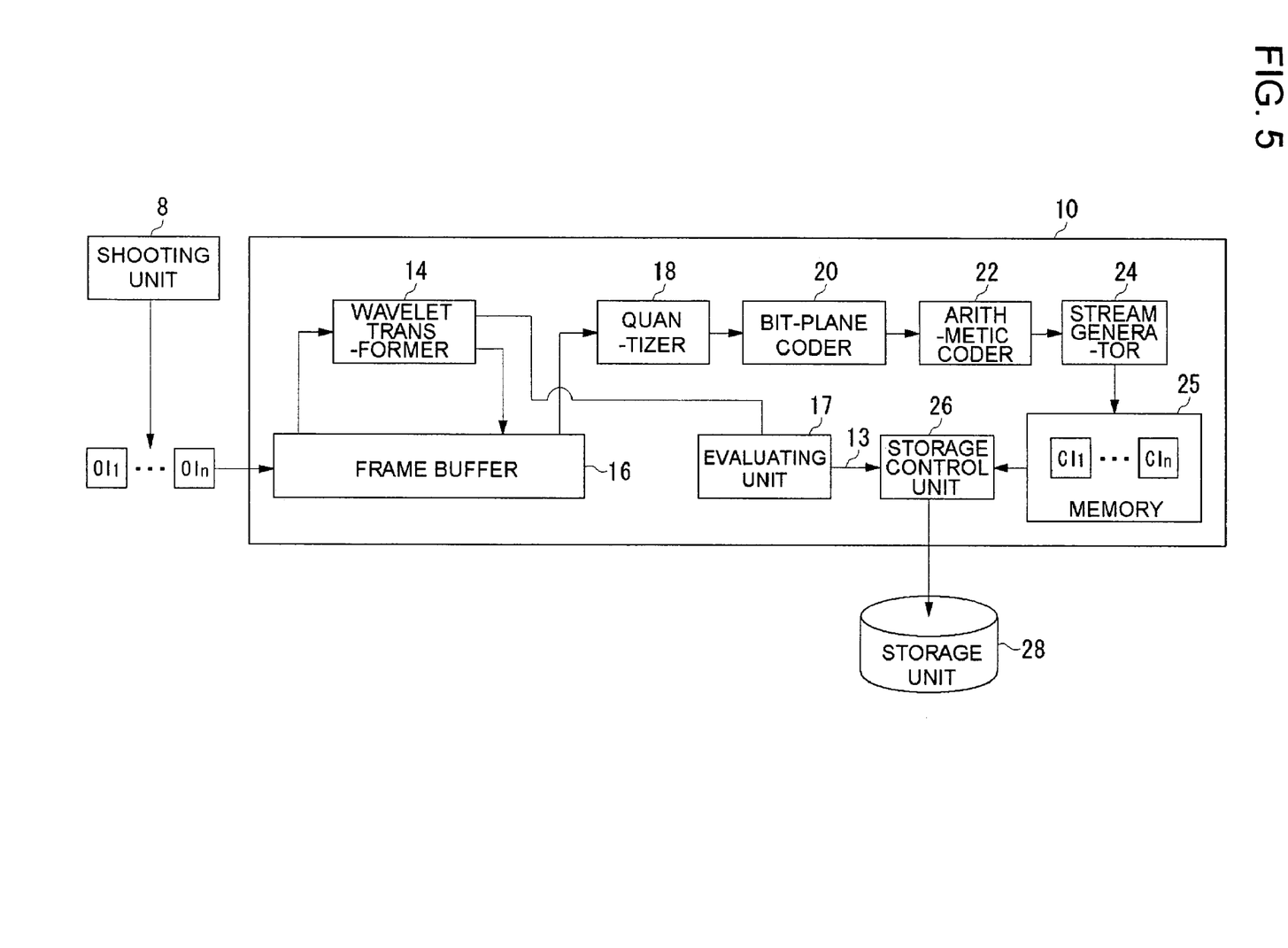
FIG. 5 is a block diagram showing a structure of an image coding apparatus to Embodiment 2.

FIG. 5 shows the configuration of an image coding apparatus 10 according to Embodiment 2. In Embodiment 2, the original images $OI_1$ to $OI_n$ continuously shot by the shooting unit 8 are input to the frame buffer 16. This continuous shooting may be performed for a relatively short period as a sequential shooting by a digital camera or may be performed for a long period as in a security camera. The manner in which the structure and behavior of this embodiment differs from those of Embodiment 1 are now explained below.

Each of the original images $OI_1$ to $OI_n$ stored in the frame buffer 16 is transformed by the wavelet transformer 14. Each of the transformed images is processed by the quantizer 18, the bit-plane coder 20, the arithmetic coder 22, and the stream generator 24. Coded image data $CI_1$ to $CI_n$ corresponding to the original images $OI_1$ to $OI_n$ are finally generated by the stream generator 24 and stored in the memory 25.

The evaluating unit 17, as in Embodiment 1, evaluates the quality of each of the original images $OI_1$ to $OI_n$ according to the wavelet coefficients of the sub-bands which contain the high frequency components, and selects one image as the best image, i.e., the one which has the largest count of high frequency components, out of the original images $OI_1$ to $OI_n$, and sends a storing indication signal 13 for the best image to a storage control unit 26. The storage control unit 26 reads the coded image data of the best image from the memory 25 according to the storing indication signal 13 and stores it in a storage unit 28.

The evaluating unit 17 may evaluate how the distribution of the wavelet coefficient values of the sub-bands which contain the high frequency components changes among the original images $OI_1$ to $OI_n$, and if there is a greater change than a predefined value, the evaluating unit 17 may decide that there has been a scene change. It relies on the knowledge that the distribution of the high frequency components can change greatly if the scene changes, although the low frequency components do not show much change. If it is decided that the scene change has occurred, it becomes meaningless to select one image, which has the largest amount of the high frequency components, out of the original images $OI_1$ to $OI_n$ across the scene change, and to evaluate the selected image as being the best image to be stored as described above. Therefore further such evaluation is not performed.

The evaluating unit 17 may select the image that is involved in the scene change and send the storing indication signal 13 for the image to the storage control unit 26. For instance, a security camera will shoot uniform images continuously for a normal period, however, if any abnormal situation occurs, the scene change will be detected and only images shot during such an abnormal period will be stored in the storage device 28.

Figure 6:
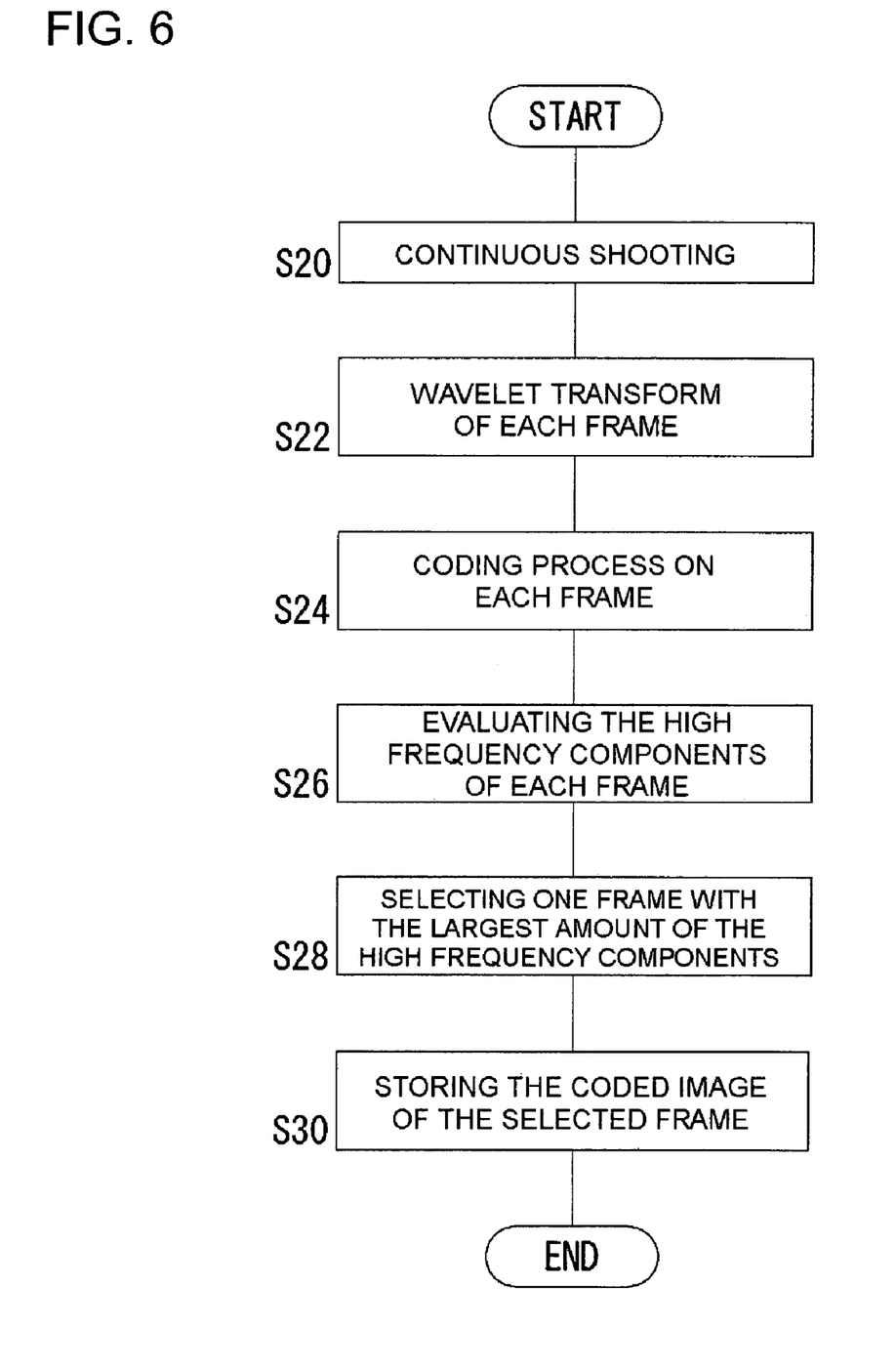
FIG. 6 is a flowchart showing one image coding procedure employed by the image coding apparatus of FIG. 5.

FIG. 6 is a flowchart showing the image coding procedure employed by the image coding apparatus 10 with the above-mentioned configuration. The images are shot continuously (S20). Each of the image frames shot continuously is transformed by the wavelet transformer 14 (S22). The coding process is conducted on each of the wavelet transformed frames and the coded image data of each frame are finally stored in the memory 25 (S24). The evaluating unit 17 evaluates the number of high frequency components in each frame according to the wavelet transform coefficients (S26). The evaluating unit 17 selects one frame that has the largest number of high frequency components as the best frame (S28). The storage control unit 26 reads the coded image data corresponding to the best frame selected by the evaluating unit 17 from the memory 25 and stores it in the storage unit 28 (S30).

Figure 7:
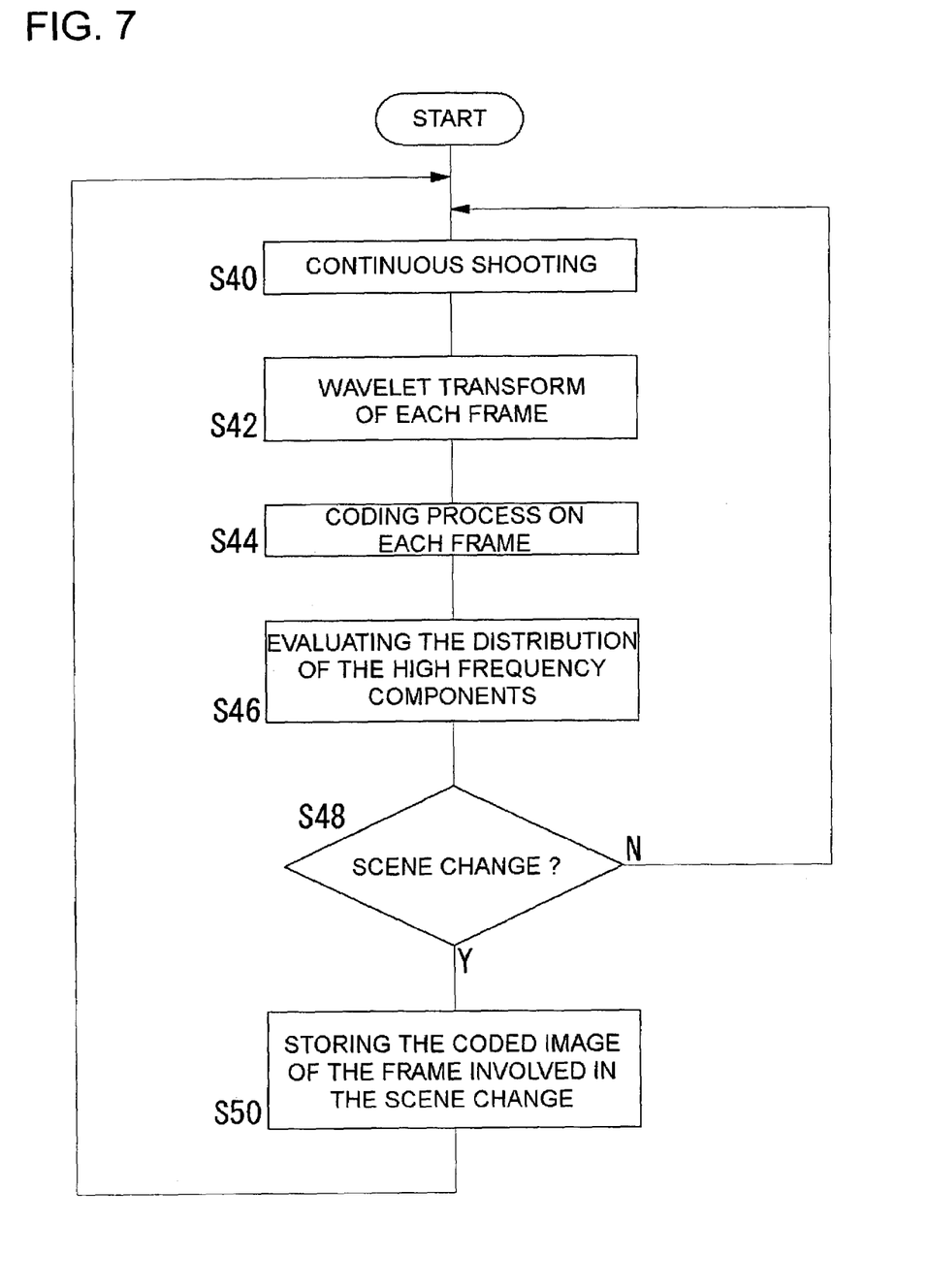
FIG. 7 is a flowchart showing another image coding procedure employed by the image coding apparatus of FIG. 5.

FIG. 7 is a flowchart showing the image coding procedure in which a scene change has been detected. The steps S40, S42 and S44 are the same as the steps S20, S22 and S24 of FIG. 6 and each of the image frames shot continuously is coded and stored in the memory 25. The evaluating unit 17 evaluates the distribution of the high frequency components according to the wavelet transform coefficients of each frame (S46), and checks any large change in the distribution of the high frequency components across the continuous frames and thereby determines whether any scene change occurs (S48). If it is decided that there is a scene change (Y of S48), the storage control unit 26 reads the coded image data corresponding the frame that is involved in the scene change from the memory 25, and stores it to the storage unit 28 (S50), and then the procedure goes back to step S40 and the continuous shooting of images is repeated. If it is decided that there is no scene change (N of S48), the image frame is not stored and the procedure goes back to step S40 and the continuous shooting is repeated.

As described above, according to these embodiments, the amount of high frequency component can be evaluated using the intermediate state of the wavelet transform in progress and the insufficient image quality which might be the result of camera shake, poor focus, a scene change or the like can be detected. Since the wavelet transform is a necessary process for compressing the image to be stored and the image quality is evaluated using the intermediate result of the process, no additional computational costs arise. Moreover, when the image quality is not good, the coding process subsequent to the wavelet transform can be canceled and the computation costs can be held down.

Although the present invention has been described by way of exemplary embodiments, it should be understood that many changes and substitutions may be made by those skilled in the art without departing from the spirit and the scope of the present invention which is defined only by the appended claims. Such changes and substitutions may be provided as follows.

In Embodiment 2, each of the images shot continuously is coded and one image evaluated as being the best, or again, the image involved in a scene change is selected and stored. Since this evaluation of the image to be stored is conducted at the time of the wavelet transform, the subsequent coding process may be performed only on the best image or the image involved in the scene change and the coding process may be omitted for the other images.

In Embodiment 2, continuous shooting of the images may be conducted while the user is absent, and the best image may be selected from the images shot continuously and stored. In addition a mode for selecting the best mode may also be explicitly provided and continuous shooting and the selection of the best image may be performed when the user selects that mode.

In the above-mentioned embodiments, the wavelet transform is explained as a spatial filtering for coding images, however, any other spatial frequency transform that is capable of filtering the high frequency components of the whole image may be used.

The image coding apparatus according to these embodiments can be incorporated into the image processing unit of a digital camera, a camcorder, or a security camera, and the apparatus can shoot still images and motion pictures and record them. Moreover, the apparatus can be applied to the case in which images shot at a remote location are displayed in real time on Web pages via the Internet using a Web camera or the like. In this case, the image coding apparatus is used for compressing the images shot at a remote site and the compressed images are distributed via a network and are decoded and displayed at a computer at the receiving site.

What is claimed is:

1. An image coding apparatus comprising:
    a spatial filter which conducts a filtering process on an image in such a manner that the whole shot image is handled as a single item;
    a coding unit which codes the image on a basis of a processing result produced by the spatial filter; and
    an evaluating unit which evaluates the quality of the image according to an amount of high frequency component in the image which is extracted during the filtering process by the spatial filter,
    wherein a plurality of images continuously shot are input, and the evaluating unit decides that there is a scene change when a greater amount of change than a predefined one is detected in a distribution of the high frequency component in the images.

2. The apparatus of claim 1, further comprising a storage control unit which selectively stores into a memory the image which is involved in the scene change.

3. The apparatus of claim 1, wherein the coding process carried out by the coding unit is conducted on the image which is judged by the evaluating unit to be involved in the scene change.

4. The apparatus of claim 1, wherein the spatial filter conducts a two-dimensional wavelet transform on the image and the evaluating unit evaluates the quality of the image according to the wavelet transform coefficients of at least one of HL, LH, and HH sub-bands generated from the image by the spatial filter.

5. An image coding apparatus comprising:
    a spatial filter which conducts a filtering process on an image in such a manner that the whole shot image is handled as a single item;
    a coding unit which codes the image on a basis of a processing result produced by the spatial filter; and
    an evaluating unit which evaluates the quality of the image according to an amount of high frequency component in the image which is extracted during the filtering process by the spatial filter,
    wherein the evaluating unit judges the quality of the image according to the high frequency component of an important region of the image.

6. The apparatus of claim 5, wherein a plurality of images continuously shot are input, and the evaluating unit decides that there is a scene change when a greater amount of change than a predefined one is detected in a distribution of the high frequency component in the images.

7. An image coding apparatus comprising:
    a spatial filter which conducts a filtering process on an image in such a manner that the whole shot image is handled as a single item;
    a coding unit which codes the image on a basis of a processing result produced by the spatial filter; and
    an evaluating unit which evaluates the quality of the image according to an amount of high frequency component in the image which is extracted during the filtering process by the spatial filter,
    wherein the evaluating unit counts the wavelet transform coefficients within the sub-band, an absolute value of each of which exceeds a predefined value, and evaluates the image quality depending on the count.

8. The apparatus of claim 7, wherein a plurality of images continuously shot are input, and the evaluating unit decides that there is a scene change when a greater amount of change than a predefined one is detected in a distribution of the high frequency component in the images.

9. An image coding method comprising:
    conducting a two-dimensional wavelet transform on the whole shot image;
    coding the image on a basis of a result of the two-dimensional wavelet transform; and
    evaluating the quality of the image according to an amount of high frequency component in an image extracted in the two-dimensional wavelet transform,
    wherein a plurality of images continuously shot are input, and the evaluating unit decides that there is a scene change when a greater amount of change than a predefined one is detected in a distribution of the high frequency component in the images.

* * * * *